United States Patent
Saino et al.

(10) Patent No.: US 9,311,028 B2
(45) Date of Patent: Apr. 12, 2016

(54) PRINT JOB MANAGEMENT APPARATUS (71) Applicants: KABUSHIKI KAISHA TOSHIBA, Tokyo (JP); TOSHIBA TEC KABUSHIKI KAISHA, Tokyo (JP)

(72) Inventors: Hisashi Saino, Numazu Shizuoka (JP); Hidenobu Suzuki, Numazu Shizuoka (JP); Aiko Okajima, Yokohama Kanagawa (JP); Shigeji Kanada, Kawasaki Kanagawa (JP); Kiyoshi Tsunashima, Yokohama Kanagawa (JP); Yoshihiro Tsujimura, Mishima Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/455,810

(22) Filed: Aug. 8, 2014

(65) Prior Publication Data

US 2016/0041797 A1 Feb. 11, 2016

(51) Int. Cl.
*B41J 29/393* (2006.01)
*G06F 3/12* (2006.01)
*G06K 15/10* (2006.01)

(52) U.S. Cl.
CPC ............ *G06F 3/1222* (2013.01); *G06F 3/1203* (2013.01); *G06F 3/126* (2013.01); *G06F 3/1238* (2013.01); *G06F 3/1267* (2013.01)

(58) Field of Classification Search
CPC .............. G03G 15/50; G03G 15/5087; G03G 2215/00109; G03G 15/5091; G06F 3/1296; G06F 21/31; B41J 29/393; G06K 15/107
USPC .......... 347/19; 358/1.13, 1.15, 1.8, 3.05, 3.06
See application file for complete search history.

(56) References Cited

U.S. PATENT DOCUMENTS 8,184,319 B2 * 5/2012 Hagiwara .................... 358/1.15

FOREIGN PATENT DOCUMENTS

JP    2011-255651    12/2011

* cited by examiner

*Primary Examiner* — An Do
(74) *Attorney, Agent, or Firm* — Patterson & Sheridan, LLP (57) ABSTRACT

A print job management apparatus includes a storage unit in which a plurality of print jobs are stored, a holding condition managing unit, and a print controlling unit. The holding condition managing unit determines whether any of the print jobs satisfy a holding condition. The print controlling unit transmits each print job that is determined to satisfy the holding condition through a communication unit to an image forming apparatus.

17 Claims, 5 Drawing Sheets

<DATA TABLE #1>

| USER ID | PRINT JOB | PRINT DATA | STORAGE TIME | HOLDING CONDITION | UPPER LIMIT OF DATA STORAGE AMOUNT | | CHARGE |
|---|---|---|---|---|---|---|---|
| | | | | | UPPER LIMIT OF DATA HOLDING CAPACITY | UPPER LIMIT OF NUMBER OF TIMES OF DATA HOLDING | |
| USER ID 1 | 1 | PRINT DATA 1 | YYYY/MM/DD 00:00 | 24 HOURS | 100 MB | 50 TIMES | 8 DOLLARS |
| | 2 | PRINT DATA 2 | YYYY/MM/DD 00:00 | 1 HOUR | | | |
| | 3 | PRINT DATA 3 | YYYY/MM/DD 00:00 | 3 HOURS | | | |
| | ... | ... | ... | ... | | | |
| USER ID 2 | 1 | ... | ... | ... | 50 MB | 5 TIMES | 0 |
| | 2 | ... | ... | ... | | | |
| | 3 | ... | ... | ... | | | |
| | ... | ... | ... | ... | | | |
| ... | | | | | ... | ... | ... |

PRINT JOB MANAGEMENT APPARATUS

BACKGROUND

An image forming apparatus such as a Multi Function Peripheral (MFP) has functions such as a copy function and a scan function.

In general, the image forming apparatus is shared by a plurality of users. As a result, a first user may erroneously recognize a sheet of a second user which is output from the image forming apparatus as a sheet belonging to the first user, and obtain the sheet. Further, the second user may forget to pick up the output sheet.

DETAILED DESCRIPTION

A print job management apparatus according to an embodiment includes a storage unit in which a plurality of print jobs are stored, a holding condition managing unit that determines whether a holding condition of a print job is satisfied, and a print controlling unit that transmits each print job that is determined to satisfy the holding condition through a communication unit to an image forming apparatus.

Herein, the print job management apparatus according to the present embodiment is described with reference to drawings.

Figure 1:
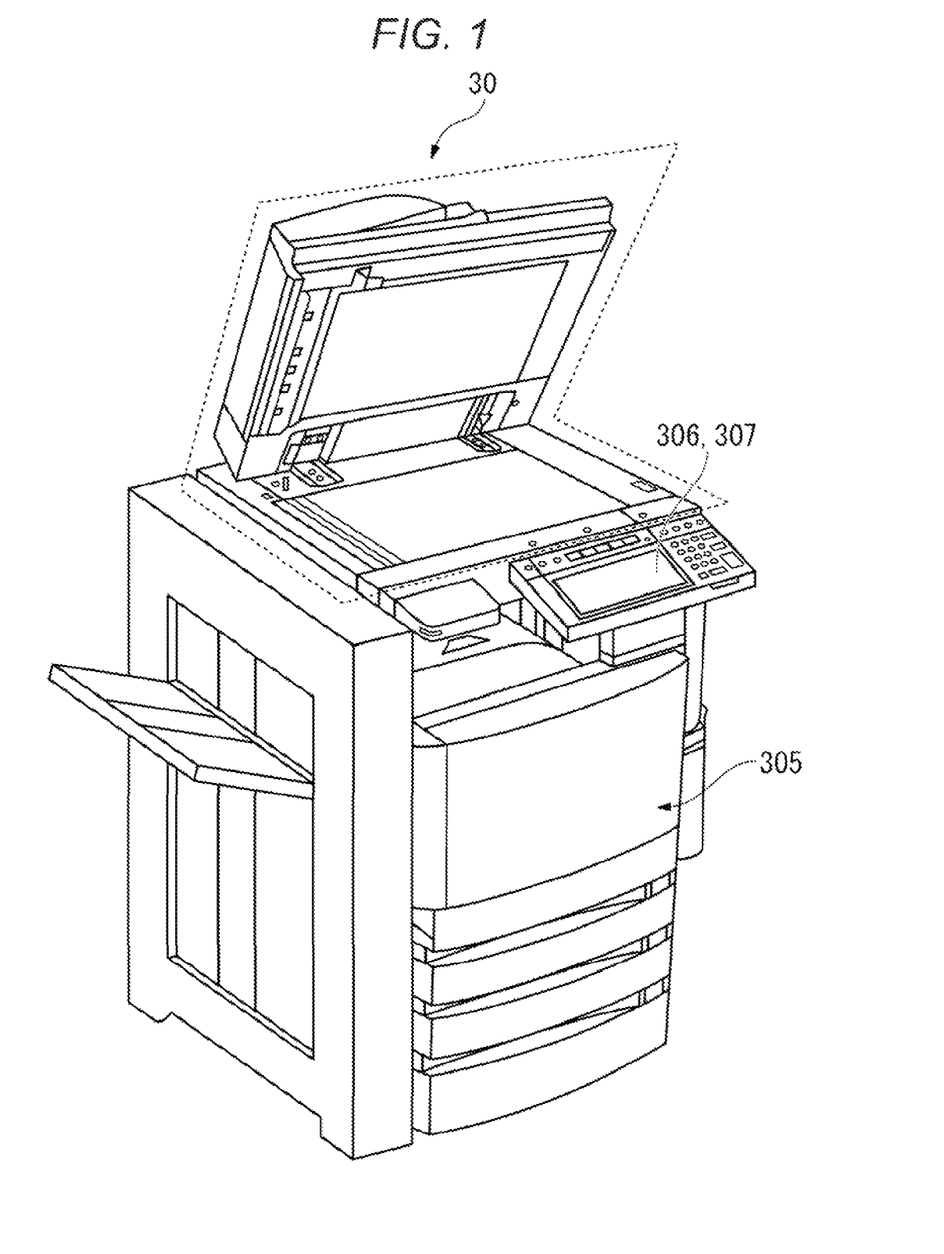
FIG. 1 is a perspective view illustrating an example image forming apparatus according to an embodiment.

FIG. 1 is a perspective view illustrating an example configuration of an image forming apparatus 30 according to the present embodiment. For example, an image forming apparatus 30 may be a multi function peripheral. The image forming apparatus 30 reads an image and generates image data (digital data).

The image forming apparatus 30 includes a printing unit 305, an input unit 306, and an output unit 307. The image forming system 1 is not limited to a type of image forming apparatus that fixes a toner image; it may also be an inkjet-type image forming apparatus.

Figure 2:
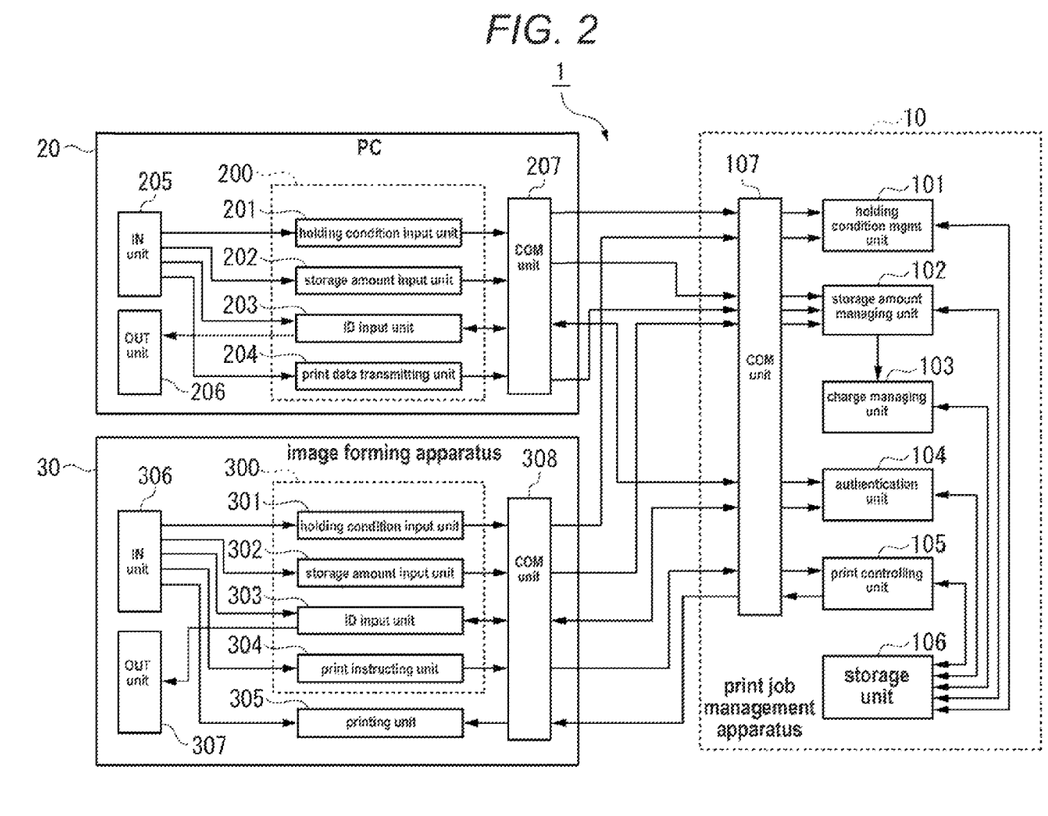
FIG. 2 is a block diagram illustrating an example configuration of an image forming system, according to the embodiment.

FIG. 2 is a block diagram illustrating an example configuration of the image forming system 1 according to the present embodiment. The image forming system 1 according to the present embodiment includes a print job management apparatus 10 which may be a server, a personal computer 20 (hereinafter referred to as "PC 20"), and the image forming apparatus 30.

The print job management apparatus 10 includes a holding condition managing unit 101, a storage amount managing unit 102, a charge managing unit 103, an authentication unit 104, a print controlling unit 105, a storage unit 106, and a communication unit 107.

The holding condition managing unit 101 manages a holding condition of a print job per print job. For example, the holding condition is data storage time for each print job. If the data storage time passes, the holding condition managing unit 101 removes the print jobs. The holding condition managing unit 101 may manage the holding condition for each print job of each user.

The storage amount managing unit 102 manages the data storage amount for the print jobs. For example, the data storage amount may be a data holding capacity for the print jobs. For example, the data storage amount is the number of times of the data holding for each print job. The storage amount managing unit 102 sets the upper limit of the data storage amount for the print jobs per user. The storage amount managing unit 102 records the input print data on the storage unit 106. The storage unit 106 does not store print data that exceeds the data storage amount that is set per user. The storage amount managing unit 102 may set the upper limit of the data storage amounts for the print jobs for the print job management apparatus 10.

The charge managing unit 103 sets whether to charge for the usage of the print job management apparatus 10 by the user. For example, the charge managing unit 103 sets whether to charge based on the data storage amount for the print jobs.

The authentication unit 104 authenticates a user based on an input user ID.

The print controlling unit 105 transmits the print data to the image forming apparatus 30 based on a request from the image forming apparatus 30.

The storage unit 106 is a storage unit that stores various kinds of data required by the print job management apparatus 10.

The communication unit 107 communicates with a communication unit of another apparatus network through a network (not shown in the figure).

The PC 20 includes a control unit 200, an input unit 205, an output unit 206, and a communication unit 207.

The control unit 200 includes a holding condition input unit 201, a storage amount input unit 202, an ID input unit 203, and a print data transmitting unit 204.

The holding condition input unit 201 transmits the holding conditions of the print jobs through the communication unit 207 to the print job management apparatus 10.

The storage amount input unit 202 transmits the upper limit value of the data storage amount of the print job through the communication unit 207 to the print job management apparatus 10.

The ID input unit 203 transmits the user ID through the communication unit 207 to the print job management apparatus 10.

The print data transmitting unit 204 transmits print data desired to be output to the image forming apparatus 30 through the communication unit 207 to the print job management apparatus 10.

The input unit 205 generates signals corresponding to the user operation using the application program dedicated to the image forming system 1. For example, the input unit 205 is a touch panel.

The output unit 206 outputs various menus and information to be notified to the user using the application program dedicated to the image forming system 1. For example, the output unit 206 is a display.

The communication unit 207 communicates with a communication unit of another apparatus through a network (not shown in the figure).

The image forming apparatus 30 includes a control unit 300, the input unit 306, the output unit 307, and a communication unit 308.

The control unit 300 includes a holding condition input unit 301, a storage amount input unit 302, an ID input unit 303, and a print instructing unit 304.

The holding condition input unit 301 transmits the holding condition for the print job through the communication unit 308 to the print job management apparatus 10.

The storage amount input unit 302 transmits the upper limit value of the data storage amount for the print job through the communication unit 308 to the print job management apparatus 10.

The ID input unit 303 transmits the user ID through the communication unit 308 to the print job management apparatus 10.

The print instructing unit 304 transmits the output instruction signal (which instructs output of the designated print data through the communication unit 308) to the print job management apparatus 10.

The printing unit 305 prints the print data that is output by the printing controlling unit 105 on a sheet.

The input unit 306 generates signals corresponding to the user operation using the application program dedicated to the image forming system 1. For example, the input unit 306 is a touch panel.

The output unit 307 outputs various menus and information to be notified to the user using the application program dedicated to the image forming system 1. For example, the output unit 307 is a display.

The communication unit 308 communicates with a communication unit of another apparatus through a network (not shown in the figure).

Figure 3:
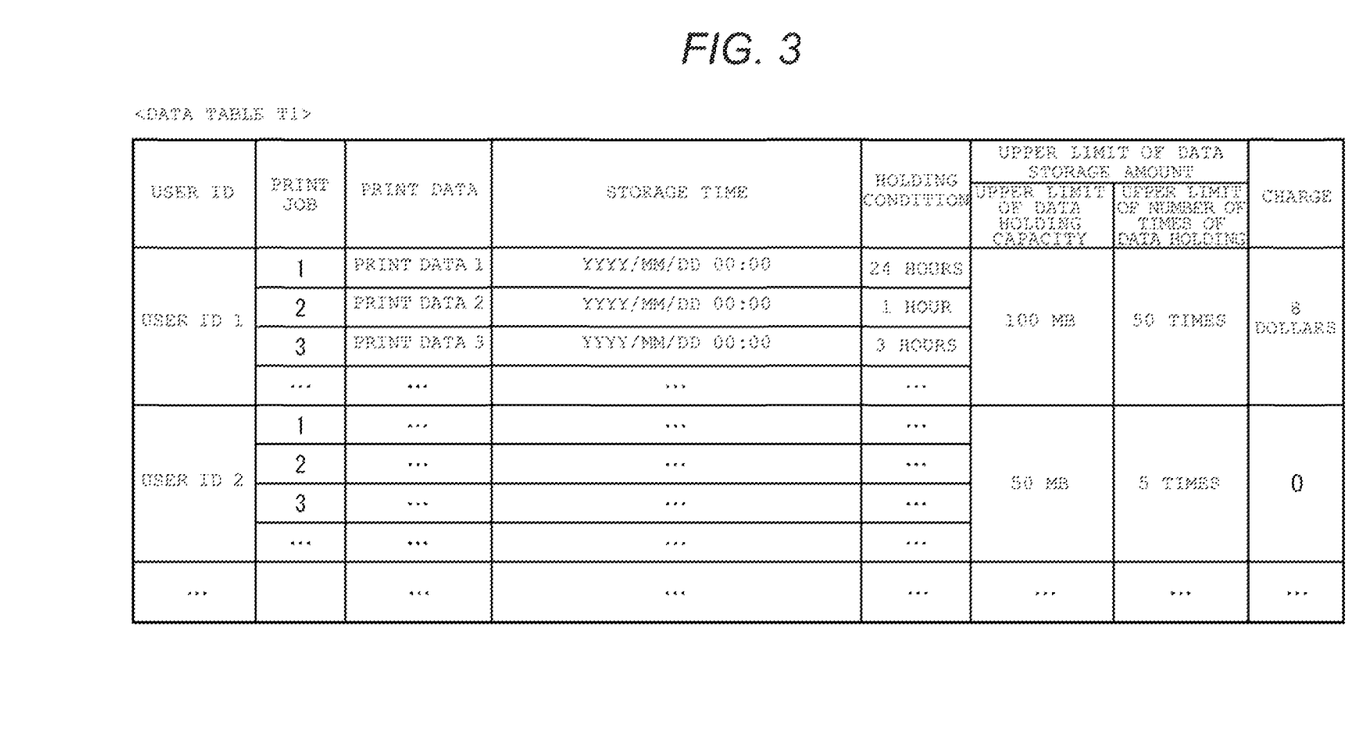
FIG. 3 illustrates an example data table stored by the storage, according to the embodiment.

FIG. 3 illustrates an example data table T1 stored by the storage unit 106. The data table T1 includes a correlation between the user ID and the print data recorded by the user. The data table T1 also includes a correlation between the user ID and the time when the user records the print data. The data table T1 also includes a correlation between the user ID and the holding condition. The data table T1 also includes a correlation between the user ID and the upper limit of the data storage amount. The data table T1 also includes a correlation between the user ID and the charge information.

Figure 4:
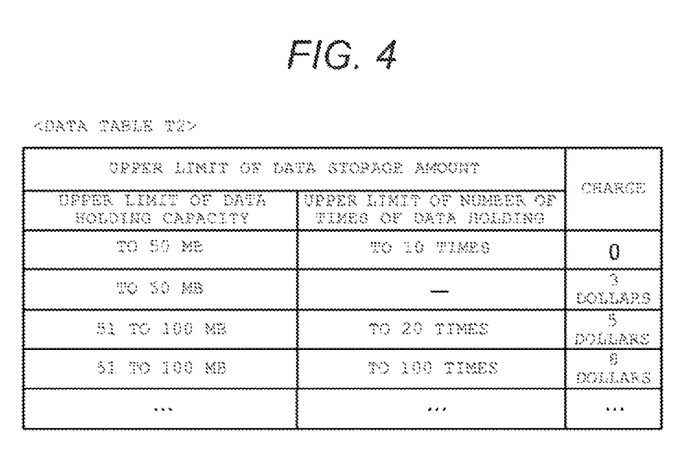
FIG. 4 illustrates another example data table stored by the storage unit, according to the embodiment.

FIG. 4 illustrates another example data table T2 stored by the storage unit 106. The data table T2 includes a correlation between the upper limit of the data storage amount and the charge information. The charge managing unit 103 obtains the upper limit of the data storage amount from the storage amount managing unit 102. The charge managing unit 103 specifies the charge information of the data table T1 based on the upper limit of the data storage amount presented by the data table T2.

Figure 5:
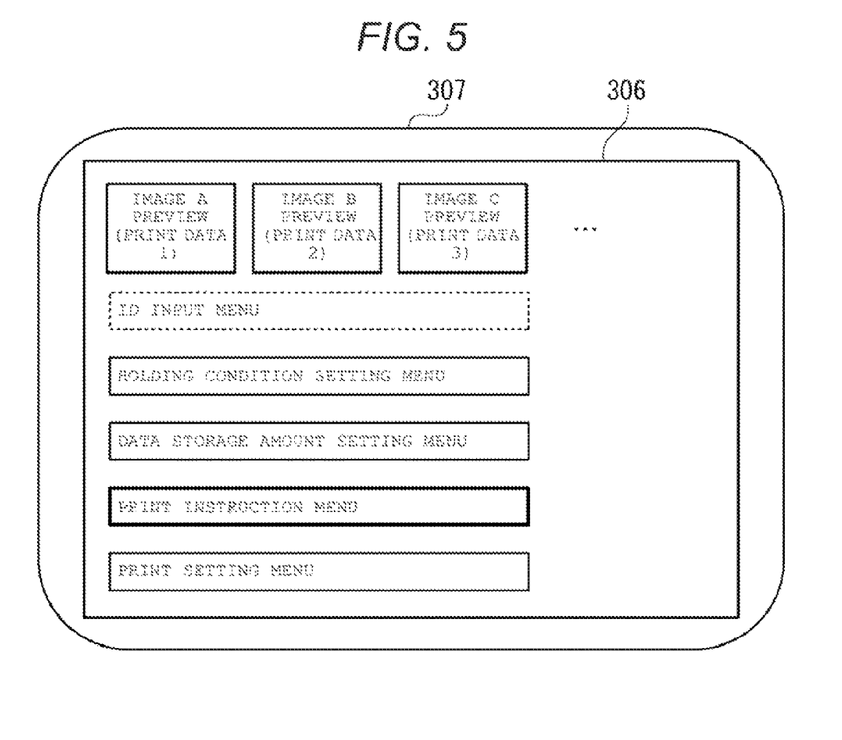
FIG. 5 illustrates an example menu output by an output unit, according to the embodiment.

FIG. 5 illustrates an example menu output by the output unit 307 for display. The menu presented by the output unit 307 includes an ID input menu for authenticating a user. The menu presented by the output unit 307 also includes a holding condition setting menu for setting the holding condition. The menu presented by the output unit 307 also includes a data storage amount setting menu for setting the data storage amount. The menu presented by the output unit 307 also includes a print instruction menu for selecting an image to be printed. The menu presented by the output unit 307 also includes a print setting menu for setting the print condition. The display shown in FIG. 5 also illustrates a preview of an image to be printed when the user selects the print instruction menu.

Figure 6:
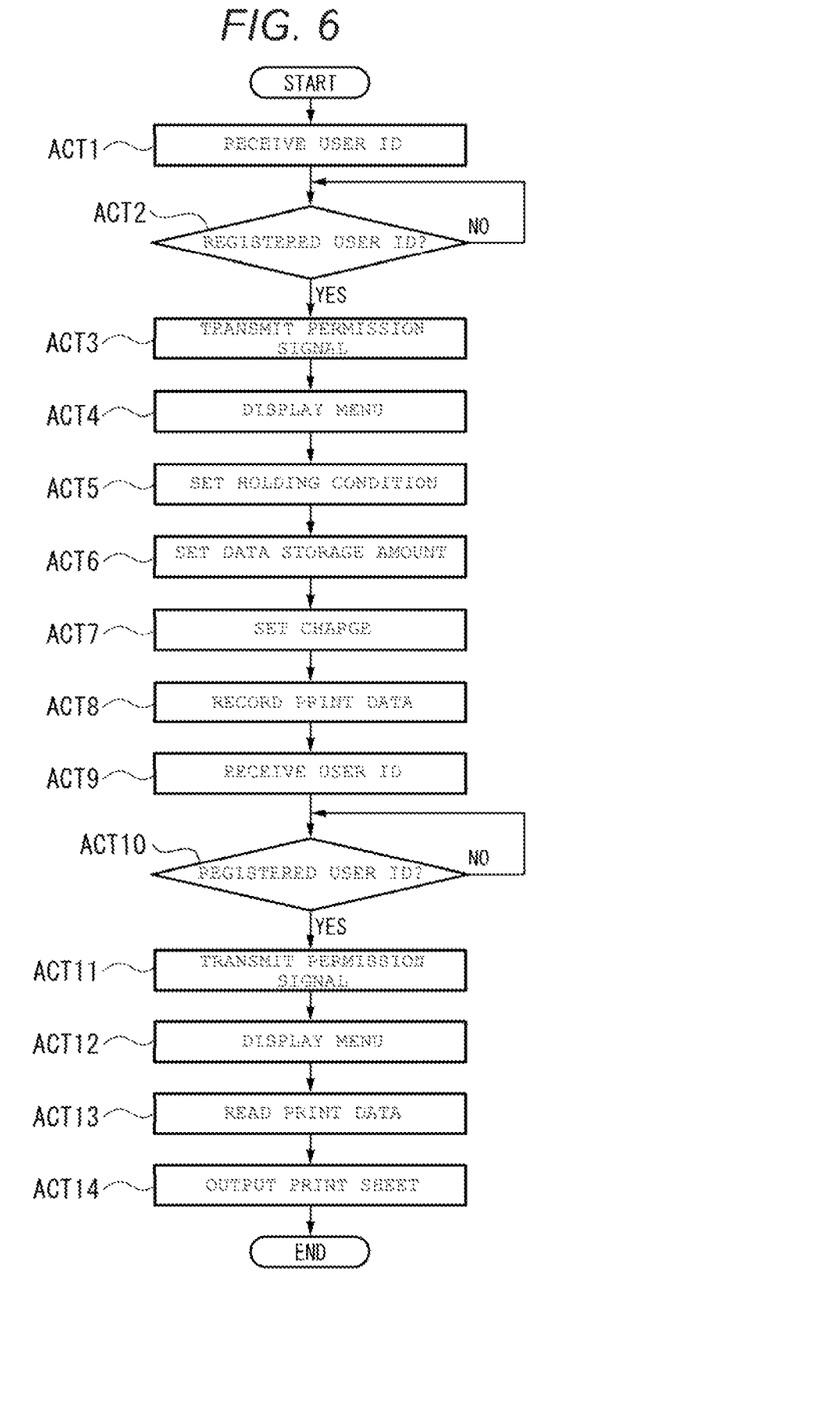
FIG. 6 is a flow chart illustrating an example sequence of operations of the image forming system, according to the embodiment.

FIG. 6 is a flow chart illustrating an example sequence of operations of the image forming system 1 according to the present embodiment. The operation of the image forming system 1 according to the present embodiment is described with reference to FIG. 6. In addition, the dedicated application program is installed in advance on the print job management apparatus 10 in the image forming system 1. The dedicated application program is also installed in advance on the PC 20. The dedicated application program is also installed in advance in the image forming apparatus 30. The dedicated application program is executed in each apparatus. Further, the user is subjected to the user registration in advance to a service provided by the image forming system 1.

The user inputs the user ID to the input unit 205. The input unit 205 outputs the user ID to the ID input unit 203. The ID input unit 203 receives the user ID from the input unit 205. The ID input unit 203 transmits the user ID through the communication unit 207 to the print job management apparatus 10. The authentication unit 104 receives the user ID from the PC 20 through the communication unit 107 (ACT 1). The authentication unit 104 determines whether the received user ID is the registered user (ACT 2). For example, the authentication unit 104 reads the data table T1 from the storage unit 106. The authentication unit 104 sequentially compares the received user ID to the user IDs included in the data table T1. If the received user ID is identical to one of the user IDs included in the data table T1 each other, the authentication unit 104 determines that the received user ID is the user ID of the registered user (ACT 2: YES). The authentication unit 104 transmits a permission signal to the PC 20 through the communication unit 107 (ACT 3). The permission signal is a signal to permit holding condition setting, data storage amount setting, print data transmission, and print instructions. If the received user ID is not identical to one of the user IDS included in the data table T1,. the authentication unit 104 determines that the received user ID is not the user ID of a registered user (ACT 2: NO). The process of the image forming system 1 returns to the process of ACT 2 for determining the next received user ID.

The ID input unit 203 receives the permission signal from the print job management apparatus 10 through the communication unit 207. The ID input unit 203 outputs the permission signal to the output unit 206. The output unit 206 receives the permission signal from the ID input unit 203. The output unit 206 displays the menus based on the application program (ACT 4). The menus include the holding condition setting menu, the data storage amount setting menu, the print data transmission menu, and the like.

The user operates the input unit 205. For example, the user sets the holding condition (i.e., the data storing time of the print job) by using the input unit 205. The input unit 205 outputs the holding condition setting signal designated by the user to the holding condition input unit 201 according to the user operation. The holding condition setting signal includes the holding condition. The holding condition input unit 201 receives the holding condition setting signal from the input unit 205. The holding condition input unit 201 transmits the user ID and the holding condition setting signal through the communication unit 207 to the print job management apparatus 10. The holding condition managing unit 101 receives the user ID and the holding condition setting signal from the PC 20 through the communication unit 107. The holding condition managing unit 101 records the holding condition included in the received holding condition setting signal, in association with the corresponding user ID in the data table T1 (ACT 5).

The user may further operate the input unit 205. For example, the user sets the upper limit of the data storage amount by using the input unit 205. The upper limit of the data storage amount may be an upper limit of the data storage capacity, an upper limit of the number of times of the data storage, and the like. The input unit 205 outputs the data storage amount setting signal to the storage amount input unit 202 according to the user operation. The data storage amount setting signal includes the upper limit of the data storage amount designated by the user. The storage amount input unit 202 inputs the data storage amount setting signal from the input unit 205. The storage amount input unit 202 transmits the user ID and the data storage amount setting signal through the communication unit 207 to the print job management apparatus 10. The storage amount managing unit 102 receives the user ID and the data storage amount setting signal from the PC 20 through the communication unit 107. The storage amount managing unit 102 records the upper limit of the data storage amount presented by the data storage amount setting signal, in association with the corresponding user ID in the data table T1 (ACT 6). The storage amount managing unit 102 reads the data table T2 from the storage unit 106. The storage amount managing unit 102 specifies the upper limit of the data storage amount that is identical to the upper limit of the recorded data storage amount in the read data table T2. The storage amount managing unit 102 records the charge corresponding to the upper limit of the specified data storage amount in association with the corresponding user ID in the data table T1 (ACT 7).

The user may further operate the input unit 205. For example, the user selects the print data by using the input unit 205. The input unit 205 outputs the print data designated by the user to the print data transmitting unit according to the user operation. The print data transmitting unit 204 receives the print data from the input unit 205. The print data transmitting unit 204 transmits the user ID and the print data through the communication unit 207 to the print job management apparatus 10. The storage amount managing unit 102 receives the user ID and the print data from the PC 20 through the communication unit 107. The storage amount managing unit 102 stores the received print data in association with the corresponding user ID in the data table T1 of the storage unit 106 (ACT 8).

The processes of the user authentication, the setting of the holding condition, the setting of the data storage amount, the storing of the charge, and the storing of print data, all of which are performed by the print job management apparatus 10, are described above.

Subsequently, the user moves to a location where the image forming apparatus 30 is installed. The user inputs the user ID to the input unit 306. The input unit 306 outputs the user ID to the ID input unit 303. The ID input unit 303 receives the user ID from the input unit 306. The ID input unit 303 transmits the user ID through the communication unit 308 to the print job management apparatus 10. The authentication unit 104 receives the user ID from the image forming apparatus 30 through the communication unit 107 (ACT 9). The authentication unit 104 determines whether the received user ID is the user ID of a registered user (ACT 10). For example, the authentication unit 104 sequentially compares the received user ID to each user ID of the data table T1. If the received user ID and a user ID in the data table T1 are identical to each other, the user ID of a registered user (ACT 10: YES). The authentication unit 104 transmits a permission signal to the image forming apparatus 30 through the communication unit 107 (ACT 11). The permission signal is a signal to permit setting of the holding condition, setting of the data storage amount, and print instructions. If the received user ID is not identical to a user ID in the data table T1, the authentication unit 104 determines that the received user ID is not the user ID of a registered user (ACT 11: NO). The process of the image forming system 1 returns to the process of ACT 10 for the determination of the next received user ID.

The ID input unit 303 receives the permission signal from the print job management apparatus 10 through the communication unit 308. The ID input unit 303 outputs the permission signal to the output unit 307. The output unit 307 receives the permission signal from the ID input unit 303. The output unit 307 displays the menus based on the application program (ACT 12). For example, the output unit 307 displays the menus as illustrated in FIG. 5. The menus include the holding condition setting menu, the data storage amount setting menu, the print instruction menu, the print setting menu, and the like.

The user operates the input unit 306 in order to designate the print data. The input unit 306 outputs the print data designating signal to the print instructing unit 304 according to the user operation. The print data designating signal identifies the print data designated by the user. The print instructing unit 304 receives the print data designating signal from the input unit 306. The print instructing unit 304 transmits the user ID and the print data designating signal through the communication unit 308 to the print job management apparatus 10. The print controlling unit 105 receives the user ID and the print data designating signal from the image forming apparatus 30 through the communication unit 107. Based on the received user ID, the print controlling unit 105 retrieves the print data corresponding to the print data designating signal from the storage unit 106 (ACT 13). For example, the print controlling unit 105 identifies the user ID corresponding to the received user ID in the data table T1 of the storage unit 106. The print controlling unit 105 then retrieves the print data identified by the received print data designating signal, from among plural print data that is recorded in association with the specified user ID. The print controlling unit 105 reads the specified print data from the storage unit 106. The print controlling unit 105 transmits the print data and the control signal through the communication unit 107 to the image forming apparatus 30. The control signal is a signal for printing out the image presented by the print data on the sheet.

The printing unit 305 receives the print data and the control signal from the print job management apparatus 10 through the communication unit 308. The printing unit 305 prints the image presented by the print data on the sheet, based on the received control signal. The printing unit 305 outputs the printed sheet (ACT 14).

In addition, the user may cause the print job management apparatus 10 to perform predetermined processes through the image forming apparatus 30 by operating the input unit 306 included in the image forming apparatus 30. The predetermined processes are the processes of the user authentication, the setting of the holding condition, the setting of the data storage amount, and the record of the charge. Further, the user may change the print settings of the image forming apparatus 30 by operating the input unit 306 before printing. The print settings are the setting of the size of the print sheet, the setting of monochrome or color printing, and the like.

The process performed by the image forming system 1 is described above.

According to this, the image forming apparatus 30 may output a sheet for each user in the image forming system 1 that includes the print job management apparatus 10. For this, the image forming system 1 that includes the print job management apparatus 10 may decrease the possibility that the user erroneously recognizes and obtains a sheet. Further, the image forming system 1 that includes the print job management apparatus 10 may decrease the possibility that the user forgets to pick up the sheet output by the user.

In addition, the user may set the holding condition, the data storage amount of the print job, and the user ID from a portable terminal (not illustrated). The portable terminal includes a holding condition input unit, a storage amount input unit, an ID input unit, an input unit, an output unit, and a communication unit.

In addition, the storage unit 106 according to the present embodiment may be included in any places as long as the transmission and the reception of information may be appropriately performed. Further, the plurality of storage units 106 may be included as long as the transmission and the reception of information may be appropriately performed. Further, the storage unit 106 may store data dispersively as long as the transmission and the reception of information may be appropriately performed.

In addition, the processes according to the present embodiment may change the order thereof as long as the transmission and the reception may be appropriately performed.

According to the print job management apparatus 10 according, to the at least one of the embodiments described above, the possibility that the user erroneously recognize and obtain a sheet may decreases. Further, according to the print job management apparatus 10 according to at least one of the embodiments described above, the possibility that the user forgets to pick up the sheet output by the user may decreases.

In addition, though the embodiments are described, in the image forming system 1 described above, the print job management apparatus 10 may have a computer system inside. In the image forming system 1 described above, the personal computer 20 may include a computer system therein. Further, in the image forming system 1 described above, the image forming apparatus 30 may include a computer system therein. Subsequently, the steps of the processes described above are stored in a computer readable recording medium in a form of a program. The processes are performed by reading and executing the program by a computer. Here, the computer readable recording medium refers to a magnetic disk, a magneto-optic disk, CD-ROM, DVD-ROM, a semiconductor memory, and the like. Further, the computer program may be distributed to the computer by a communication line and the computer that receives the distribution may execute the corresponding program.

Further, the program may be a program to achieve a portion of the functions described above. Further, the program may be a program to achieve the aforementioned functions by being combined with a program already recorded in the computer system. That is, the program may be a so-called difference file (difference program).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A print job management apparatus comprising:
   a communication unit configured to receive a plurality of print jobs and, for each print job, a data storage time which indicates a period of time for storing the respective print job;
   a storage unit configured to store the plurality of print jobs; and
   a processor functioning as:
      a holding condition managing unit that
         controls the storage unit to store each received data storage time in correspondence with the respective print job,
         determines whether the period of time for each print job has passed, and
         removes from the storage unit each print job for which the corresponding period of time has passed, and
      a print controlling unit that
         receives a signal from an image forming apparatus designating one of the plurality of print jobs, and
         transmits the designated print job to the image forming apparatus if the signal is received before the period of time corresponding to the designated print job passes.

2. The apparatus according to claim 1, wherein the plurality of print jobs include one or more print jobs from each of a plurality of users.

3. The apparatus according to claim 1, wherein the processor further functions as:
   a storage amount managing unit that sets an upper limit of a total data storage amount of print jobs for each of a plurality of users.

4. The apparatus according to claim 3, wherein the data storage amount is a data holding capacity for print jobs.

5. The apparatus according to claim 3, wherein the data storage amount is a number of times of data holding of the print job.

6. The apparatus according to claim 1, wherein the processor further functions as:
   a charge managing unit configured to determine whether to charge a user for usage of the print job management apparatus.

7. The apparatus according to claim 6,
   wherein the charge managing unit sets whether or not to charge the user based on a data storage amount of the print job.

8. The apparatus according to claim 1, wherein the processor further functions as:
   an authentication unit configured to
      receive a user ID via the communication unit,
      authenticate a user based on the user ID, and
      transmit a permission signal via the communication unit to one of a terminal device and the image forming apparatus which transmitted the authenticated user ID, the permission signal allowing a user of the terminal device or the image forming apparatus to set the data storage time.

9. A method of managing print jobs in a print job management apparatus the method comprising the steps of:
   receiving a plurality of print jobs and, for each print job, a data storage time which indicates a period of time for storing the respective print job;
   controlling a storage unit to store each received data storage time in correspondence with the respective print job;
   determining whether the period of time of each print job has passed;

removing from the storage unit each print job for which the corresponding period of time has passed;

receiving a signal from an image forming apparatus designating one of the plurality of print jobs; and transmitting the designated print job to the image forming apparatus if the signal is received before the period of time corresponding to the designated print job passes.

10. The method according to claim 9, wherein the plurality of print jobs include one or more print jobs from each of a plurality of users.

11. The method according to claim 9, further comprising: setting an upper limit of a total data storage amount of print jobs for each of a plurality of users.

12. The method according to claim 9, further comprising: receiving a user ID via a communication unit, authenticating a user based on the user ID, and transmitting a permission signal via the communication unit to one of a terminal device and the image forming apparatus which transmitted the authenticated user ID, the permission signal allowing a user of the terminal device or the image forming apparatus to set the data storage time.

13. The method according to claim 12, further comprising: charging the user based on a data storage amount of the print job.

14. A non-transitory computer readable medium comprising instructions that causes a print job management apparatus to carry out the steps of:

receiving a plurality of print jobs and, for each print job, a data storage time which indicates a period of time for storing the respective print job;

controlling a storage unit to store each received data storage time in correspondence with the respective print job;

determining whether the period of time of each print job has passed;

removing from the storage unit each print job for which the corresponding period of time has passed;

receiving a signal from an image forming apparatus designating one of the plurality of print jobs; and transmitting the designated print job to the image forming apparatus if the signal is received before the period of time corresponding to the designated print job passes.

15. The non-transitory computer readable medium according to claim 14, wherein the plurality of print jobs include one or more print jobs from each of a plurality of users.

16. The non-transitory computer readable medium according to claim 14, wherein the steps further comprise:

setting an upper limit of a data storage amount of print jobs for each of a plurality of users.

17. The non-transitory computer readable medium according to claim 14, wherein the steps further comprise:

receiving an user ID via a communication unit;

authenticating a user based on the user ID; and transmitting a permission signal via the communication unit to one of a terminal device and the image forming apparatus which transmitted the authenticated user ID, the permission signal allowing a user of the terminal device or the image forming apparatus to set the data storage time.

* * * * *